United States Patent Office 3,308,111
Patented Mar. 7, 1967

3,308,111
POLYOLEFIN COMPOSITIONS
Harry Braus, Springdale, and Fred D. Waas, Cincinnati, Ohio., assignors to National Distillers and Chemical Corporation, New York, N.Y., a corporation of Virginia
No Drawing. Filed Nov. 8, 1963, Ser. No. 322,518
11 Claims. (Cl. 260—94.9)

This invention relates to additives for polyolefins, and, more particularly, to anti-static agents for polyethylene.

Static charges on plastic materials have long been a problem. The charges accumulate on the plastic object, for example, polyolefin film or molded polyolefin, and remain there until discharged. These static charges give rise to many serious difficulties, foremost among which is the collection of dust. Not only does the dust make the product unattractive aesthetically, but also it results in practical problems, as when, for example, the plastic article is used as part of mechanical or electrical equipment. Another important problem involves handling of the polyolefin film, that is, when static charges are present, film clings to rolls.

With the rapidly increasing use of polyolefins as containers for foods, drugs, cosmetics, bleaches, and so forth, it has become necessary that polyolefins be made as nearly static-free as possible without deleterious effect on the other properties of the polyolefins that make them particularly useful as containers. This means that, when anti-static properties are added, the product should retain its slip and anti-blocking characteristics; its optical properties, particularly gloss and clarity; and its acceptability for food and drug use. In addition, by eliminating static build-up, downtime and product loss are reduced, the danger of fire or explosion is decreased, the product remains clean longer, and the amount of cleaning required is minimized.

It is an object of this invention to provide a means of making polyolefins substantially non-susceptible to the accumulation of electrostatic charges.

Another object is to provide polyolefins that are resistant to the build-up of static charges on the surface thereof over long periods of time.

A further object is to effect the destaticization of polyolefins with materials that can be added in extremely small amounts.

Additional objects and advantages will be apparent from the following detailed description.

In addition to having no adverse effect on the slip, block, optical, and FDA-approved characteristics, an anti-static agent should be compatible with the polymer it is being used to treat and it should possess an abundance of polar groups.

It has now been found that compounds formed by the reaction of a long-chain olefin oxide with morpholine or a 4-(aminoalkyl)morpholine are compatible with polyolefins and that small amounts of such a compound or mixture of compounds are effective in imparting anti-static properties to a polyolefin.

In general, the anti-static agents of this invention are product mixtures prepared by one of the following equations:

(1)

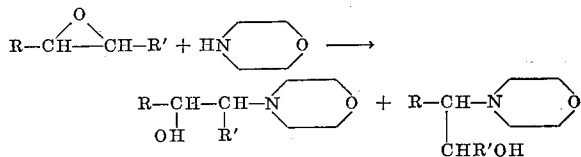

or (2)

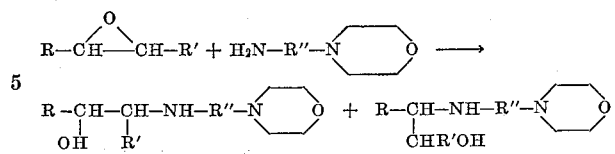

The olefin oxide can be any compound of the general structure

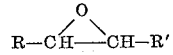

wherein R is a saturated aliphatic hydrocarbon radical having from about 8 to 22 carbon atoms and R' is hydrogen or a saturated aliphatic hydrocarbon radical having from about 1 to 6 carbon atoms. Examples of the epoxide include 1,2-decylene epoxide, 1,2-dodecylene epoxide, 1,2-hexadecylene epoxide, 1,2-octadecylene epoxide, 1,2-tetracosenyl epoxide, 2,3-dodecylene epoxide, 7,8-octadecylene epoxide, and the like. Terminal epoxides, i.e., those in which the R' is hydrogen, are preferred.

The 4-(aminoalkyl)morpholines have the formula

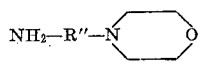

wherein R'' is a saturated hydrocarbon diradical, preferably containing from about 1 to 4 carbon atoms. Suitable compounds include 4-(α-aminomethyl)morpholine, 4-(β-aminoisopropyl)morpholine, 4-(γ-aminopropyl)morpholine, and the like.

The novel products of the process of this invention are generally mixtures of hydroxyalkylmorpholines such as 4-(2-hydroxyhexadecyl)morpholine,
4-(1-hydroxymethylpentadecyl)morpholine,
4-(2-hydroxyoctadecyl)morpholine, and the like, or mixtures of hydroxyalkylaminoalkyl-morpholines, such as 4-(β-hydroxyoctadecylaminopropyl)morpholine,
4-(α-hydroxymethylheptadecylaminopropyl)morpholine,
4-(β-hydroxyhexadecylaminopropyl)morpholine,
4-(β-hydroxydodecylaminoethyl)morpholine, and the like.

The novel reaction mixtures of this invention are prepared by reacting at elevated temperature 1 mole of a long-chain epoxide with at least 1 mole of morpholine or a 4-(aminoalkyl)morpholine. It is preferred, but not essential, that the amount of the morpholine compound be in excess throughout the reaction; consequently an excess of the morpholine compound, e.g., up to from about 5 to 10 moles per mole of epoxide, is used and the epoxide preferably is introduced gradually to the morpholine compound as the reaction proceeds. An inert diluent may be used, although its use is not preferred.

The reaction temperature should be in the range of about 120° to 200° C., and preferably the temperature is between about 130° and 180° C.

Completion of the reaction, ascertained by the disappearance of the epoxide, is followed by the removal of any excess of the morpholine compound by vacuum distillation. The reaction should be carried out under an inert atmosphere, e.g., nitrogen, argon, helium, or the like, in order to avoid the production of undesired colored impurities.

The resulting product has been found to be a satisfactory anti-static agent when combined with a polyolefin in an amount ranging from about 0.1 to 1.5 parts per hundred parts by weight of the polyolefin. Within this range the amount of additive required to impart a satisfactory level of anti-static behavior to a polyolefin body or layer generally increases as the thickness of the polyolefin body or layer increases. For example, for a relatively thin layer of polyolefin, e.g., a polyolefin film, it is preferred to use from about 0.10 to about 0.15 part of additive per hundred parts of polyolefin. For a relatively thick layer of polyolefin, e.g., that which generally constitutes the walls of a blown bottle, it is preferred to use from about 0.5 to about 1.0 part of additive per hundred parts of polyolefin.

The compositions may be prepared by any method that is suitable for insuring a uniform mixture of the polyolefin and the anti-static agents. Suitable methods include the addition of the additive compounds as solids, in solution in inert solvents, or as slurries in water or in other non-solvents to the polyolefin which may be in the form of either dry fluff or molding powder, followed by drying and tumbling the mixture. The additive also can be incorporated into the polyolefin by melt blending the ingredients in conventional apparatus, such as a Banbury mixer, heated rolls, or a plasticator. It is also possible to prepare a concentrate of the additive in the polyolefin by one of the aforesaid methods; this concentrate then can be blended with polyolefin molding powder by tumbling, Banbury mixing, or other suitable means. In addition, various combinations of the above methods can also be used.

The polyolefin compositions that have been destaticized by the compounds of this invention are particularly useful for fabrication by extrusion into thin films, sheets, blown bottles, blown tubing, and the like. The compositions may also be cast or molded into films, sheets, rods, tubes, piping, filaments, and other shaped articles. In addition the compositions may be used for coating paper, cloth, wire, metal foil, glass fiber mats, synthetic and natural textiles, and other substrates.

In addition to the anti-static additives disclosed herein, the polyolefin compositions may be compounded with small amounts of other additives, such as high melting waxes, antioxidants, dyes and pigments, lubricants, and the like, provided that the additional ingredients are not present in amounts sufficient to alter substantially the effectiveness of the agents employed to inhibit the accumulation of static charges.

The invention will be more fully understood by reference to the following examples which are not intended to limit the scope of the invention except as indicated by the appended claims. Unless otherwise specified, all parts are given by weight.

*Film preparation*

The additive was dry-blended with the polyolefin in powder form. The resulting blend was then fed into a 1¼ inch Egan extruder and extrusion-blown into 0.5- to 1-mil tubular film at extrusion temperatures ranging from about 275° to 350° F.

*Film testing*

(A) *Cigarette ash test.*—A piece of the film 6″ x 12″ was rubbed 10 times with a wool cloth. The film was then brought down slowly toward a fresh mound of cigarette ashes. At some finite height a sudden and rapid pick-up of ashes occurred to films retaining a static charge. This height was recorded in inches. It varied directly with the intensity of charge on the film, qualitative values being assigned as follows:

TABLE 1

| Effectiveness of Additive | Distance at which Rapid Ash Pick-up Occurs |
|---|---|
| Good | Less than 1 inch. |
| Fair | 1 to 4 inches. |
| Poor | Greater than 4 inches. |

(B) *Surface resistivity test.*—A 4″ x 4″ piece of film was placed between two electrodes which were in contact with both sides of the film. The ratio of the potential gradient parallel to the current along the film surface to the current per width of film surface is surface resistivity. It was measured with an electrometer. Surface resistivity decreases with decreases in the intensity of static charge on the surface, qualitative values being assigned as follows:

TABLE 2

| Effectiveness of Additive | Surface Resistivity, megohms |
|---|---|
| Good | Less than $10^4$. |
| Fair | $10^4$ to $5\times10^5$. |
| Poor | Greater than $5\times10^5$. |

*Bottle preparation*

A concentrate of the additive in polyolefin was prepared by dry blending the polyolefin in powder form with 25 weight percent of the additive. This dry blend was then incorporated into the main portion of the polyolefin in a quantity that would yield the final desired level of anti-static agent. Incorporation was achieved by Banbury mixing at 280° F. for 7 to 8 minutes. The resulting homogeneuos blend was granulated, fed into a 1¼ inch Egan extruder, and then extrusion-blow molded at a parison temperature of 375° to 385° F. and a mold temperature of 50° to 60° F. into 12-ounce rectangular bottles weighing 28 grams each. These bottles were conditioned for testing by placing them in a constant temperature and humidity room for 24 hours.

*Bottle testing*

The level of anti-static behavior was evaluated by the Static Decay Test and the Soot Chamber Test. The former was employed primarily to measure the initial level of static charge and the rate of charge dissipation over a 24-hour storage period. It was found that effective additives generally showed lower initial voltage and rapid decay until essentially no charge was remaining after 24 hours. The Soot Chamber Test was used to measure directly the ultimate level of static charge achieved. Generally a value of zero in the Static Decay Test corresponded to a value of "slight" to "none" in the Soot Chamber Test.

(A) *Static decay test.*—A blown bottle was rubbed 10 times with a fresh paper towel and allowed to stand in 50 percent relative humidity for 24 hours. The surface of the bottle was tested at the beginning and at the end of this period for the amount of static charge remaining by means of an electrostatic voltmeter (Custom Scientific Instruments Model CS66 Electrostatic Voltmeter).

(B) *Soot chamber test.*—A blown bottle was rubbed 10 times with a fresh paper towel and allowed to stand in a soot chamber for 24 hours. At the end of this period soot produced from the burning of toluene-saturated filter paper in a separate combustion chamber was circulated around the bottle for 15 minutes. The bottle was then checked visually for soot deposition and assigned a value of "heavy," "medium," "slight," or "none."

EXAMPLE I

Into a 1-liter 3-necked round-bottomed flask fitted with a stirrer, thermometer, dropping funnel, and a water-cooled reflux condenser and blanketed with nitrogen was placed 348 grams (4.0 moles) of morpholine. The morpholine was brought to reflux (135° C.) and 101 grams (0.4 mole) of a 60/40 mixture of 1,2-epoxyhexadecane and 1,2-epoxyoctadecane was added dropwise with stirring over a two-hour period. After an additional reflux period of one hour, the excess morpholine was removed by distillation under a vacuum generated by a water aspirator. 127 grams of a light brown liquid remained upon cooling. An infrared spectrum of the product was indicative of a mixture containing major portions of 4-(2-hydroxyhexadecyl)morpholine and 4-(2-hydroxyoctadecyl)morpholine and minor portions of 4-(1-hydroxymethylpentadecyl)morpholine and 4-(1-hydroxymethylheptadecyl)morpholine.

EXAMPLE II 220 grams (1.5 moles) of 4-(γ-aminopropyl)morpholine was placed in the apparatus of Example I. It was heated under nitrogen to 150° C., after which 50 grams (0.2 mole) of a 60/40 mixture of 1,2-epoxyhexadecane and 1,2-epoxyoctadecane was added dropwise with vigorous stirring over a period of one hour at a temperature between 150° and 165° C. The mixture was stirred an additional two hours in the same temperature range, after which the excess morpholine compound was removed by vacuum distillation. A brown residue remained, weighing 97.5 grams and exhibiting a melting point of 42°–50° C. An infrared spectrum indicated that the product mixture contained major portions of 4-(β-hydroxyhexadecylaminopropyl)morpholine and 4-(β-hydroxyoctadecylaminopropyl)morpholine and minor portions of 4-(α-hydroxymethylheptadecylaminopropyl)morpholine and 4-(α-hydroxymethylpentadecylaminopropyl)morpholine.

The additives prepared by the procedures of Examples I and II were compounded with conventional polyethylene and formed into films and with linear polyethylene and formed into bottles. Test results on the films and bottles containing an anti-static agent are presented in Table 3 along with comparative results for tests on films and bottles prepared in the same manner but containing no anti-static agent.

What is claimed is:
1. A composition of matter comprising a mixture of compounds having the general structures

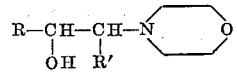

and

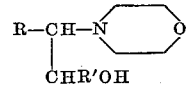

wherein R is a saturated aliphatic hydrocarbon radical having from about 8 to 22 carbon atoms and R' is a member of the group consisting of hydrogen and a saturated aliphatic hydrocarbon radical having from about 1 to 6 carbon atoms.

2. A composition of matter comprising a mixture of compounds having the structures

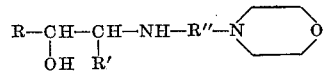

and

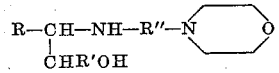

wherein R is a saturated aliphatic hydrocarbon radical having from 8 to 22 carbon atoms, R' is a member of the group consisting of hydrogen and a saturated aliphatic hydrocarbon radical having from about 1 to 6 carbon atoms, and R" is a saturated hydrocarbon diradical containing from about 1 to 4 carbon atoms.

TABLE 3

| Example | Resin | Blend | | Evaluation | |
|---|---|---|---|---|---|
| | | Additive, Percent | Form Tested | Test | Test Value and Rating |
| (a) | Polyethylene, density 0.922; melt index 9.1 | 0 | Blown Film | (b) | 5–9 Poor. |
| | | | | (c) | 5×10⁶ Poor. |
| I | do | 0.15 | do | (b) | 3–4 Fair. |
| II | do | 0.15 | do | (b) | ½–1 Good. |
| | | | | (c) | 1×10⁵ Fair. |
| (d) | Linear Polyethylene, density 0.960; melt index 6.0 | 0 | Blown Bottle | (e) | Initial: 140,000; Final: 100,000. |
| | | | | (f) | Heavy. |
| I | do | 1.0 | do | (e) | Initial: 60,000; Final: 0. |
| | | | | (f) | Medium. |
| II | do | 1.0 | do | (e) | Initial: 50,000; Final: 0. |
| | | | | (f) | Slight. |

(a) Film Control.
(b) Cigarette Ash Test.
(c) Surface Resistivity Test.
(d) Bottle Control.
(e) Static Decay Test.
(f) Soot Chamber Test.

As can be seen from the above data, the addition of anti-static agents to polyethylene resulted in products that were superior in all of the tests to polyethylene containing no such additives.

EXAMPLE III

The anti-static agent prepared by the procedure of Example I was incorporated into polypropylene (density 0.905, melt flow rate at 230° C., 5.0) and the resulting composition was formed into bottles. The results of tests made on the fabricated products were comparable to those obtained with linear polyethylene containing an anti-static agent.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

3. A composition of matter comprising a mixture of 4-(2-hydroxyhexadecyl)morpholine and 4-(2-hydroxyoctadecyl)morpholine.

4. A composition of matter comprising a mixture of 4-(β-hydroxyhexadecylaminopropyl)morpholine and 4-(β-hydroxyoctadecylaminopropyl)morpholine.

5. An anti-static agent for polyolefins comprising a mixture of compounds selected from mixtures of compounds having the general structures (a)

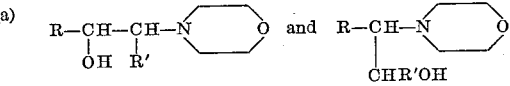

and (b)

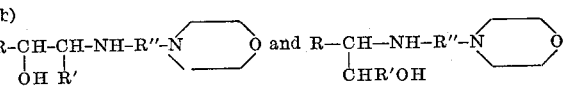

wherein R is a saturated aliphatic hydrocarbon radical having from about 8 to 22 carbon atoms, R' is a member of the group consisting of hydrogen and a saturated aliphatic hydrocarbon radical having from about 1 to 6 carbon atoms, and R'' is a saturated hydrocarbon diradical containing about 1 to 4 carbon atoms.

6. A composition comprising a polyolefin and an anti-static agent, said anti-static agent comprising a mixture of compounds selected from mixtures of compounds having the general structures (a) 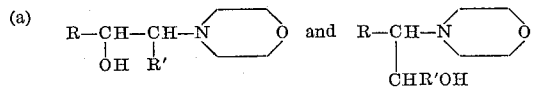

and (b) 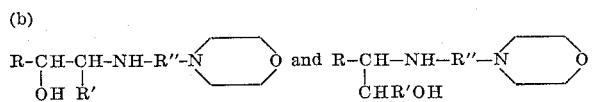

wherein R is a saturated aliphatic hydrocarbon radical having from about 8 to 22 carbon atoms, R' is a member of the group consisting of hydrogen and a saturated aliphatic hydrocarbon radical having from about 1 to 6 carbon atoms, and R'' is a saturated hydrocarbon diradical containing about 1 to 4 carbon atoms.

7. The composition of claim 6 wherein the polyolefin is polyethylene.

8. The composition of claim 6 wherein the polyolefin is polypropylene.

9. The composition of claim 6 wherein the amount of anti-static agent is in the range of about 0.1 to 1.5 parts per 100 parts by weight of the polyolefin.

10. A process for the preparation of an anti-static agent for polyolefins which comprises reacting at a temperature within the range of about 120° to 200° C. in an inert atmosphere 1 mole of an olefin oxide having the structure

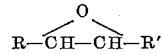

with at least 1 mole of a member of the group consisting of morpholine and a 4-(aminoalkyl)morpholine having the general structure

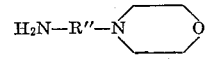

wherein R is a saturated aliphatic hydrocarbon radical having from about 8 to 22 carbon atoms, R' is a member of the group consisting of hydrogen and a saturated aliphatic hydrocarbon radical having from about 1 to 6 carbon atoms, and R'' is a saturated hydrocarbon diradical having from about 1 to 4 carbon atoms.

11. The process of claim 10 wherein the temperature is within the range of about 130° and 180° C. and 1 mole of the olefin oxide is reacted with 5 to 10 moles of the member of the group consisting of morpholine and a 4-(aminoalkyl)morpholine.

No references cited.

JOSEPH L. SCHOFER, *Primary Examiner.*

L. EDELMAN, *Assistant Examiner.*